US009988549B2

(12) United States Patent
Hong et al.

(10) Patent No.: US 9,988,549 B2
(45) Date of Patent: Jun. 5, 2018

(54) WATER-SOLUBLE COATING COMPOSITION FOR SURFACE PROTECTION OF NUCLEAR FUEL ROD

(71) Applicant: KEPCO NUCLEAR FUEL CO., LTD., Daejeon (KR)

(72) Inventors: Jongsung Hong, Daejeon (KR); Sangjae Han, Daejeon (KR); Myoungho Oh, Daejeon (KR); Sang Pil Kong, Daejeon (KR); Sung Jun Park, Daejeon (KR); Eun Woo Shin, Daejeon (KR); Gui In Shin, Daejeon (KR); Ui Jae Lee, Daejeon (KR); Keunwoo Chung, Chungcheongnam-do (KR); Young-Wun Kim, Daejeon (KR); Sangbong Lee, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 29 days.

(21) Appl. No.: 14/945,472

(22) Filed: Nov. 19, 2015

(65) Prior Publication Data

US 2016/0215164 A1    Jul. 28, 2016

(30) Foreign Application Priority Data

Jan. 23, 2015    (KR) ........................ 10-2015-0011189

(51) Int. Cl.
*G21C 3/06*        (2006.01)
*C09D 135/02*    (2006.01)
(Continued)

(52) U.S. Cl.
CPC ....... *C09D 135/02* (2013.01); *C09D 133/066* (2013.01); *G21C 3/07* (2013.01);
(Continued)

(58) Field of Classification Search
CPC .... C09D 135/02; C09D 133/066; G21C 3/07; G21C 21/02
See application file for complete search history.

(56) References Cited

U.S. PATENT DOCUMENTS 3,841,903 A * 10/1974 Huang ..................... B05D 5/04
                                                                     427/315
4,071,639 A *  1/1978 Palmer .................. C09D 5/008
                                                                     376/305
(Continued)

FOREIGN PATENT DOCUMENTS

CN    103113701 A    5/2013
RU    2 195 720 C2   12/2002

OTHER PUBLICATIONS

Korean Office Action dated Jun. 27, 2016.
Russian Office Action dated Jun. 5, 2017.
Chinese Office Action dated Sep. 15, 2017.

*Primary Examiner* — Kelly M Gambetta
(74) *Attorney, Agent, or Firm* — Rabin & Berdo, P.C.

(57)    ABSTRACT

Disclosed is a water-soluble coating composition, which is applied on the surface of fuel rods to prevent scratching of the surface of the fuel rods upon manufacturing a nuclear fuel assembly for light water reactors. This water-soluble coating composition facilitates the formation and removal of a coating film and the resulting coating film can exhibit strength and durability equivalent to those of an existing lacquer (nitrocellulose) coating film, and can thus be used as an alternative to lacquer, thereby easily removing the coating film and improving workplace safety, ultimately achieving improvements in the working environment and high workplace safety.

5 Claims, 13 Drawing Sheets

(51) Int. Cl.
   *G21C 3/07* (2006.01)
   *G21C 21/02* (2006.01)
   *C09D 133/06* (2006.01)
   *G21F 1/10* (2006.01)

(52) U.S. Cl.
   CPC ............... *G21C 21/02* (2013.01); *G21F 1/10* (2013.01); *C08L 2201/54* (2013.01); *Y02E 30/40* (2013.01)

(56) References Cited

U.S. PATENT DOCUMENTS

| | | | | |
|---|---|---|---|---|
| 5,218,018 A | * | 6/1993 | Tominaga | .............. B05D 7/532 |
| | | | | 523/402 |
| 5,270,414 A | * | 12/1993 | Saito | ..................... C08F 220/04 |
| | | | | 526/260 |
| 5,304,400 A | * | 4/1994 | Dhein | ................ C08G 18/0819 |
| | | | | 427/388.2 |
| 2013/0155497 A1 | | 6/2013 | Mochizuki | |

\* cited by examiner

FIG. 2

| High load | | |
|---|---|---|
| NC | YS-3 | MH200A |
| C4 | C14 | M4 |
| E4 | E14 | O4 |

| Low load | | |
|---|---|---|
| NC | YS-3 | MH200A |
| A1 | A17 | Q1 |
| B2 | B16 | P2 | novel water-soluble polymer EX-5-6-2

WATER-SOLUBLE COATING COMPOSITION FOR SURFACE PROTECTION OF NUCLEAR FUEL ROD

CROSS-REFERENCE TO RELATED APPLICATION

This U.S. non-provisional patent application claims priority under 35 U.S.C. § 119 of Korean Patent Application No. 10-2015-0011189, filed on Jan. 23, 2015, the entire contents of which are hereby incorporated by reference.

SPECIFIC REFERENCE TO A GRACE PERIOD INVENTOR DISCLOSURE

This invention has been published in *Journal of the Korean Society of Tribologists & Lubrication Engineers* on December 2014.

BACKGROUND OF THE INVENTION

1. Field of the Invention

The present invention relates to a water-soluble coating composition applied on the surface of nuclear fuel rods to prevent scratching of the surface of the fuel rods, which are disposed in a nuclear fuel assembly for light water reactors. More particularly, the present invention relates to a water-soluble coating composition, which facilitates the formation and removal of a coating film and in which the resulting coating film may exhibit strength and durability equivalent to those of an existing lacquer coating film.

2. Description of the Related Art

In order to manufacture nuclear fuel assemblies for light water reactors, fuel rods are loaded into a skeleton. As such, the surface of the fuel rods is coated with lacquer to prevent or minimize scratching of the surface of the fuel rods and to enable efficient loading of the fuel rods. Currently, lacquer that is useful for coating nuclear fuel rods is nitrocellulose (NC) lacquer. This lacquer is a paint material that forms a protective coating film when the solvent evaporates therefrom, and enables the formation of a tough and rigid film despite having a quick drying rate. The coating film thus formed is dissolved again in a solvent for a de-lacquering process. The solvent used for the de-lacquering process is butyl acetate.

Nitrocellulose (NC), currently used as the lacquer material, is a derivative of a natural polymer, cellulose, and is in a white powder phase, but is difficult to handle because it has explosive combustion properties to the extent that it serves as the main component of gunpowder. Furthermore, nitrocellulose may be formed into a rigid film by the evaporation of a solvent, but such a film may become brittle. Hence, the addition of a plasticizer and an alkyd resin is required to form a coating film having proper hardness and flexibility. Moreover, such a film is used under the condition that it is dissolved in an organic solvent to ensure appropriate liquidity, which undesirably and inevitably causes environmental pollution problems due to the use of the organic solvent.

Hence, the need for the development of safe and harmless alternatives to lacquer has arisen, but organic solvent type lacquer is still used to date, owing to the absence of suitable alternatives.

In particular, a lacquering process for preventing scratching of the surface of nuclear fuel rods and a de-lacquering process for removing the lacquer coating after the fuel rods have been loaded, or processes similar thereto, cannot be found even in foreign companies such as Westinghouse or AREVA. Furthermore, techniques and inventive results for water-soluble coating compositions, including loading of fuel rods without a coating film or via spraying of water, are still lacking. Coating processes using organic solvents are general, and thus domestically ensured, but have a recent tendency to be replaced by safe water-based coating systems. Thorough research into water-soluble materials is ongoing, and overcoming the limitations of water is regarded as a critical factor influencing the success of the invention.

SUMMARY OF THE INVENTION

Therefore, the present inventors have studied water-soluble coating materials based on the use of a water solvent, as an alternative to lacquer, in order to improve the working environment of field workers for nuclear fuel rod coating and to remove workplace risks such as fire or explosion hazards, and have ascertained that properly chosen water-soluble polymer resin candidates may be dissolved in water and mixed with a water-soluble volatile material such as alcohol, ultimately developing a water-soluble polymer composition applicable to a water-based system by forming a coating film at an appropriate thickness with a suitable rate of evaporation, which has led to the present invention.

Accordingly, an object of the present invention is to provide a water-soluble coating composition for coating the surface of a nuclear fuel rod, which facilitates the formation and removal of a coating film on and from the surface of the nuclear fuel rod and in which the resulting coating film may exhibit strength and durability equivalent to those of an existing lacquer coating film.

In order to accomplish the above object, the present invention provides a water-soluble coating composition for protecting the surface of a nuclear fuel rod, comprising a polymer resin of methacrylic acid and 2-hydroxyethyl methacrylate.

The water-soluble coating composition may further comprise a methyl methacrylate polymer resin.

The water-soluble coating composition may further comprise a polymer resin of styrene or 2-acrylamido-2-methyl propane sulfonic acid.

The water-soluble coating composition may be a polymer resin comprising 52-62 wt % of methacrylic acid, 34-42 wt % of 2-hydroxyethyl methacrylate, and 0.01-12 wt % of methyl methacrylate.

In addition, the present invention provides a coating solution for protecting a nuclear fuel rod, obtained by dissolving a polymer resin comprising 52-62 wt % of methacrylic acid, 34-42 wt % of 2-hydroxyethyl methacrylate and 0.01-12 wt % of methyl methacrylate in a solvent mixture of isopropanol, ethanol and water.

The coating solution may comprise 9-12 wt % of the polymer resin and 88-91 wt % of the solvent mixture of isopropanol, ethanol and water.

In addition, the present invention provides a coating method for protecting the surface of a nuclear fuel rod, comprising: (1) forming a coating film on the surface of a nuclear fuel rod, using a coating solution obtained by dissolving a polymer resin comprising 52-62 wt % of methacrylic acid, 34-42 wt % of 2-hydroxyethyl methacrylate and 0.01-12 wt % of methyl methacrylate in a solvent mixture of isopropanol, ethanol and water; (2) drying the nuclear fuel rod; and (3) loading the dried nuclear fuel rod in a skeleton.

As such, forming the coating film in (1) may be performed while a concentration of the coating solution is corrected to be maintained at an initial value by measuring a density of the coating solution using a hydrometer.

Furthermore, drying the nuclear fuel rod in (2) may be performed using hot air drying or air drying.

According to the present invention, a water-soluble coating composition facilitates the formation and removal of a coating film and in which the resulting coating film can manifest strength and durability equivalent to those of an existing lacquer coating film. Hence, this coating composition is an effective replacement for existing lacquer.

Furthermore, according to the present invention, the water-soluble coating composition for protecting the surface of a nuclear fuel rod is water soluble, and thus the coating film can be easily removed by washing with water, ultimately improving workplace safety to thus achieve improvements in the working environment and high workplace safety, compared to conventional methods using lacquer.

BRIEF DESCRIPTION OF THE DRAWINGS

The above and other objects, features and advantages of the present invention will be more clearly understood from the following detailed description taken in conjunction with the accompanying drawings, in which:

FIG. 2 illustrates the results of analysis of the load depending on the loading position of fuel rods;

FIG. 3 illustrates the results of analysis of the loading position of fuel rods and the load depending on the kind of coating composition;

FIG. 8 illustrates the positions on fuel rods at which scratch testing was conducted;

DESCRIPTION OF SPECIFIC EMBODIMENTS

Figure 1:
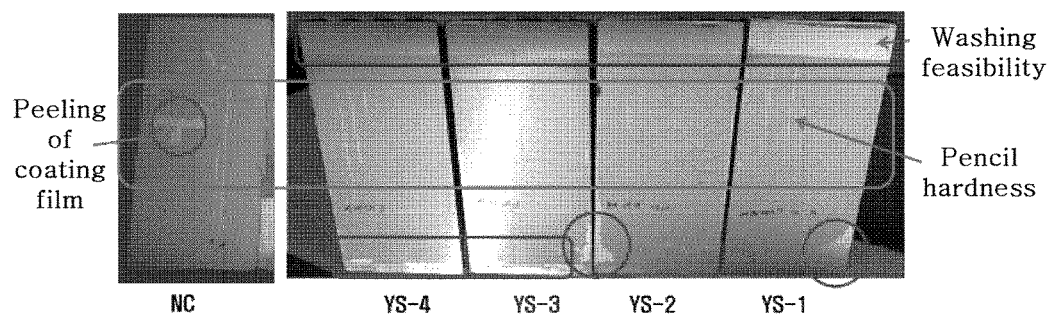
FIG. 1 illustrates the results of measurement of coating properties of a lacquer sample and water-soluble polymer resin samples.

Hereinafter, a detailed description will be given of the present invention.

An aspect of the present invention addresses a water-soluble coating composition for protecting the surface of a nuclear fuel rod, comprising a polymer resin of methacrylic acid and 2-hydroxyethyl methacrylate.

The composition may further include a methyl methacrylate polymer resin.

The composition may further include a polymer resin of styrene or 2-acrylamido-2-methyl propane sulfonic acid. The composition is preferably a polymer resin comprising 52-62 wt % of methacrylic acid, 34-42 wt % of 2-hydroxyethyl methacrylate, and 0.01-12 wt % of methyl methacrylate.

Particularly useful is a polymer resin comprising 52-56 wt % of methacrylic acid, 34-38 wt % of 2-hydroxyethyl methacrylate, and 8-12 wt % of methyl methacrylate. Based on the experimental results, the use of a polymer resin comprising 54 wt % of methacrylic acid, 36 wt % of 2-hydroxyethyl methacrylate, and 10 wt % of methyl methacrylate is very effective at forming a coating film having the optimal properties.

The present invention addresses a coating solution for protecting the surface of a nuclear fuel rod, obtained by dissolving the composition in solid form in a solvent mixture of isopropanol, ethanol and water.

The coating solution preferably comprises 9-12 wt % of a polymer resin, and 88-91 wt % of a solvent mixture of isopropanol, ethanol and water. Based on the experimental results, the use of a coating solution comprising 9 wt % of a polymer resin and 91 wt % of a solvent mixture of isopropanol, ethanol and water is very effective at forming a coating film having the optimal properties.

Another aspect of the present invention addresses a coating method for protecting the surface of a nuclear fuel rod, comprising: (1) forming a coating film on the surface of a nuclear fuel rod, using a coating solution obtained by dissolving a polymer resin comprising 52-62 wt % of methacrylic acid, 34-42 wt % of 2-hydroxyethyl methacrylate and 0.01-12 wt % of methyl methacrylate in a solvent mixture of isopropanol, ethanol and water; (2) drying the nuclear fuel rod; and (3) loading the dried nuclear fuel rod into a skeleton.

In (1), the coating film may be formed while the concentration of the coating solution is corrected to be maintained at an initial value by measuring the density of the coating solution using a hydrometer.

In (2), the drying may be performed using hot air drying or air drying.

A better understanding of the present invention may be obtained via the following examples which are set forth to illustrate, but are not to be construed as limiting the present invention, as will be apparent to those skilled in the art.

Example 1. Preparation of Water-Soluble Coating Composition

Below is a description of a method of preparing a water-soluble coating composition for coating the surface of a nuclear fuel rod.

A coating composition was prepared by dissolving 9.0 wt % of a polymer resin comprising methacrylic acid (MAA), 2-hydroxyethyl methacrylate (2-HEMA) and methyl methacrylate (MMA) at a weight ratio of 5.4:2.7:0.9 in a solvent mixture comprising 28.0 wt % of isopropanol (IPA), 50.0 wt % of ethanol (EtOH), and 13.1 wt % of water. This coating composition is referred to as a YS-3 coating composition. Other coating compositions similar to the YS-3 coating composition were prepared and tested. The polymer resins and the solvents of individual coating compositions are given in Table 1 below.

TABLE 1

Polymer resin and solvent of water-soluble coating composition

|  | A | YS-1 | YS-2 | YS-3 | YS-4 |
|---|---|---|---|---|---|
| MAA | 3.6 | 6.0 | 5.6 | 5.4 | 5.4 |
| 2-HEMA | 5.4 | 3.2 | 2.8 | 2.7 | 2.7 |
| Other resin | — | — | 0.9 (St) | 0.9 (MMA) | 0.9 (AMPS) |
| Polymer resin | 9% | 9.20% | 9.30% | 9% | 9% |
| IPA | 6.3 | 27.7 | 24.0 | 28.0 | 27.8 |
| EtOH | 50.0 | 50.0 | 50.0 | 50.0 | 50.0 |
| Water | 34.7 | 13.1 | 16.7 | 13.1 | 13.1 |
| Total | 100 | 100 | 100 | 100 | 100 |

As is apparent from Table 1, Resin A composed of MAA/2-HEMA is referred to by the new code name YS-1, and this composition was added with St (styrene) resin, MMA (methyl methacrylate) resin, and 2-acrylamido-2-methyl propane sulfonic acid (AMPS), thus synthesizing four new kinds of resins.

Example 2. Evaluation of Properties of Coating Film by Water-Soluble Coating Composition A coating film was formed using the water-soluble coating composition on a flat plate sample made of the same material as in fuel rods, dried, and then measured for pencil hardness using a pencil hardness tester. The thickness of the coating film was measured using a light-reflecting coating thickness meter. Specifically, the coating film was placed under a light source and irradiated with near infrared light, after which the amount of reflected light was measured to determine the thickness in μm using the coating thickness meter.

The adhesive strength was measured in a manner in which a 10×10 cm sized flat plate was coated with each kind of coating composition, the coating film was cut into coating pieces with a blade, and the number of detached coating pieces was counted when an adhesive tape that had been attached to the coating film was peeled from the coating film.

The properties of the coating film were measured as above. The results are illustrated in the photograph of FIG. 1.

As illustrated in FIG. 1, for washing feasibility, all of the coating films of YS-1 to YS-4 could be cleanly washed by water. The pencil hardness decreased in the sequence of YS-3→YS-1→YS-2=YS-4. The hardness of YS-3 was excellent. For adhesion measurement using an adhesive tape, all of the coating films exhibited superior adhesion, without peeling of the coating film by the adhesive tape. For coatability, which evaluates the extent of formation of a uniform coating film after drying, YS-3, YS-2, and YS-1 were slightly peeled, but the coatability thereof was determined to be good when the drying rate was controlled.

The thickness of the coating films was measured to be 1.62-1.92 μm.

Example 3. Evaluation of Coating Composition Using Fuel Rod Loading Test Apparatus In order to apply a water-soluble coating composition to actual fuel rods, a small fuel rod loading test apparatus was manufactured, and the load upon loading of fuel rods and the depth and width of scratches created on fuel rods were measured. The results of the water-soluble coating composition and the existing lacquer (NC) coating composition were compared and evaluated.

Figure 2:
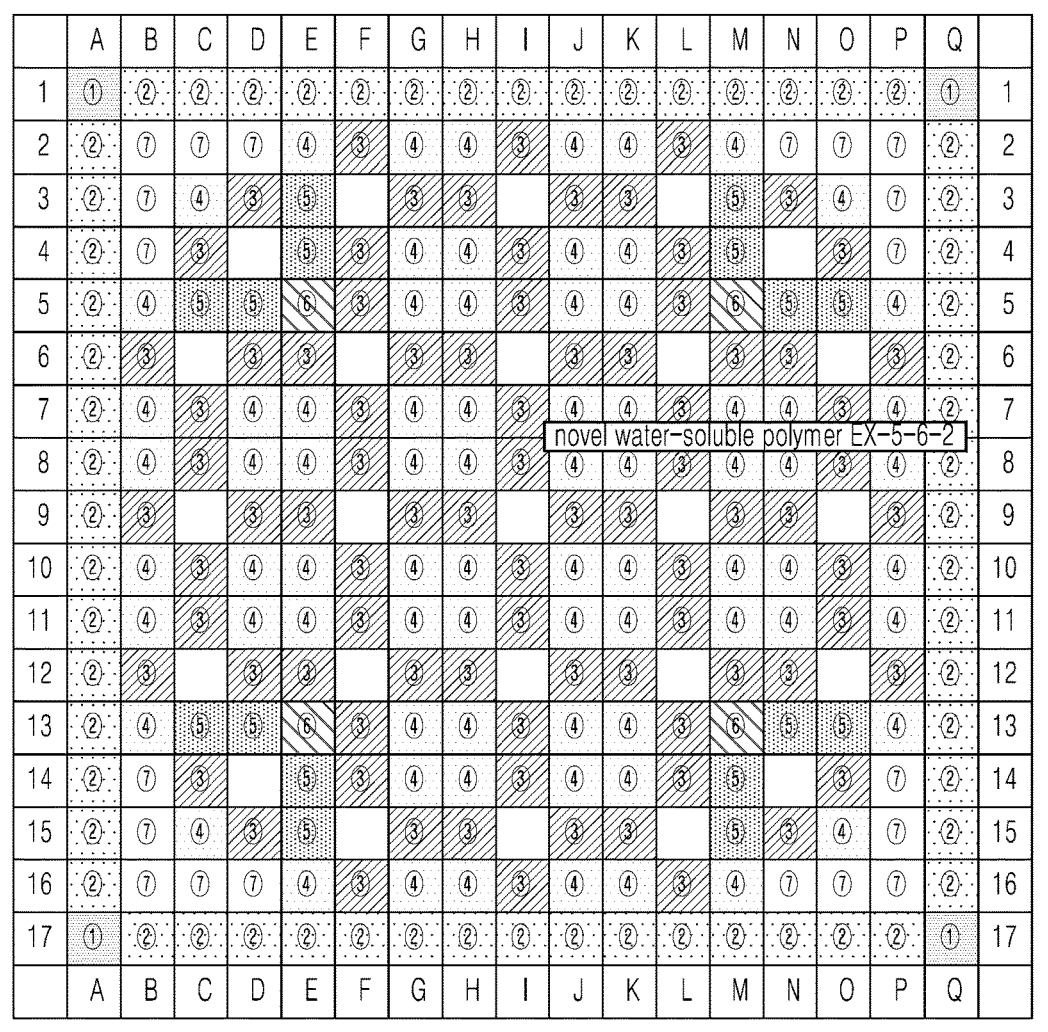

The fuel rod loading test apparatus was manufactured by downscaling a skeleton having a size of about 4 m, which is the size actually used when loading fuel rods, to a size of 1.5 m, and was configured to include three spacer grids and a total of 289 grid cells in a 17×17 arrangement, into which 264 fuel rods could be loaded, aside from 24 guide thimble tubes and one instrumentation tube. The load applied to the loaded fuel rods varied depending on the loading position, which is depicted in FIG. 2 and is shown in Table 2 below.

TABLE 2

Classification of load for fuel rod

| No | Classification of load | Magnitude of load |
|---|---|---|
| 1 | Outermost corner cells | Low load |
| 2 | Cells in contact with outside spacer grid | Low load |
| 3 | Cells close to center guide tube | High load |
| 4 | Cells around center guide tube | Low load |
| 5 | Cells close to outer guide tube | High load |
| 6 | Cells around outer guide tube | Low load |
| 7 | Outer cells | Low load |

As is apparent from Table 2, the sequence of load was assumed to be sample number 5=3>6>4>1>2>7. Based on these results, a fuel rod loading test was performed. To this end, Resin A, as a basis material, and YS-3, having the highest pencil hardness, were used.

The loading positions are shown in red in FIG. 3. The high load position and the low load position were chosen so as to be symmetrical with each other. The existing lacquer (NC) coating composition and the water-soluble coating compositions made of Resin A (represented by MH200A) and YS-3 were compared and evaluated.

As for the lacquer (NC) coating composition, the loading test was performed at high load positions of C4 and E4, one side of each of which was in contact with the guide tube, and at low load positions of A1 and B2, outer walls of which were in contact. For the YS-3 coating composition, the loading test was carried out at high load positions of C14 and E14 and at low load positions of A17 and B16.

As for Resin A (represented by MH200A), the loading test was implemented at high load positions of M4 and O4 and at low load positions of Q1 and P2, so as to be symmetrical with the lacquer (NC) loading positions. Also, a non-coated virgin fuel rod was loaded at position P2.

The load detected by the load cell fitted to the fuel rod loading test apparatus was measured in kg. The magnitude of the load depending on the loading time is graphed in FIGS. 4A to 5B.

Figure 4A:
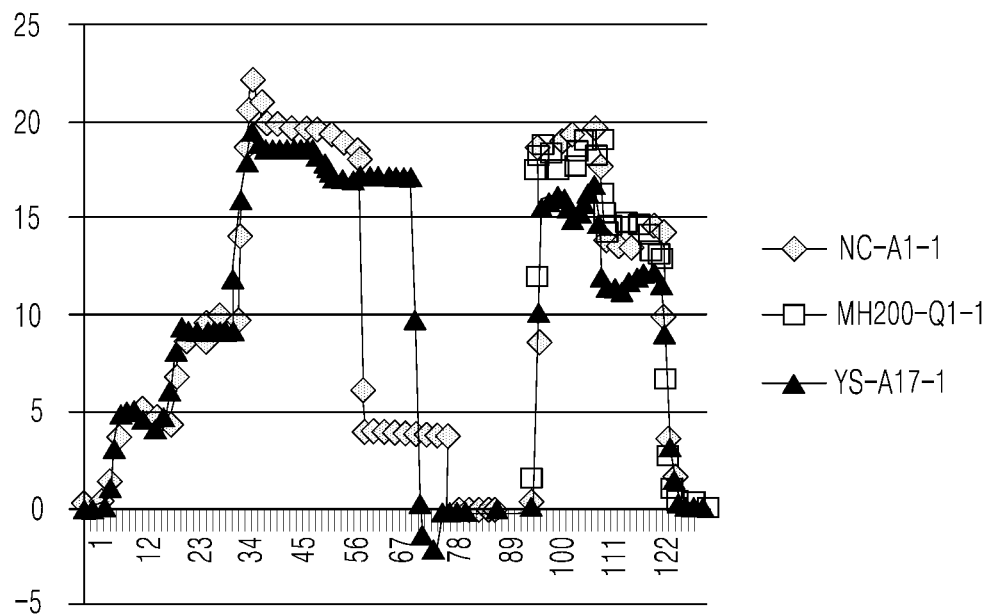
FIGS. 4A and 4B are graphs illustrating the magnitude of the load depending on the loading time of the fuel rods at low load positions.
Figure 4B:
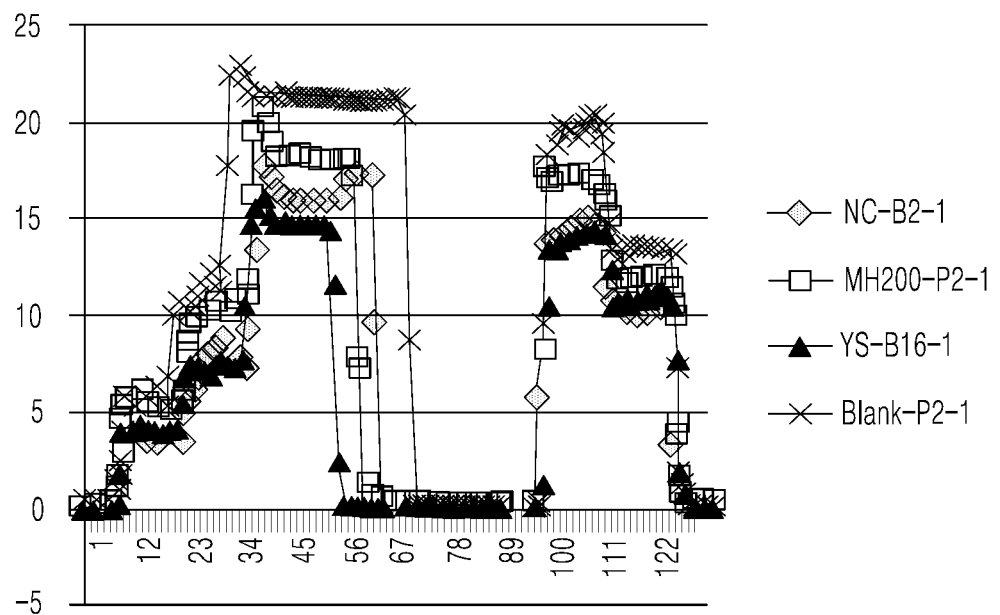
Figure 5A:
FIGS. 5A and 5B are graphs illustrating the magnitude of the load depending on the loading time of the fuel rods at high load positions.
Figure 5B:
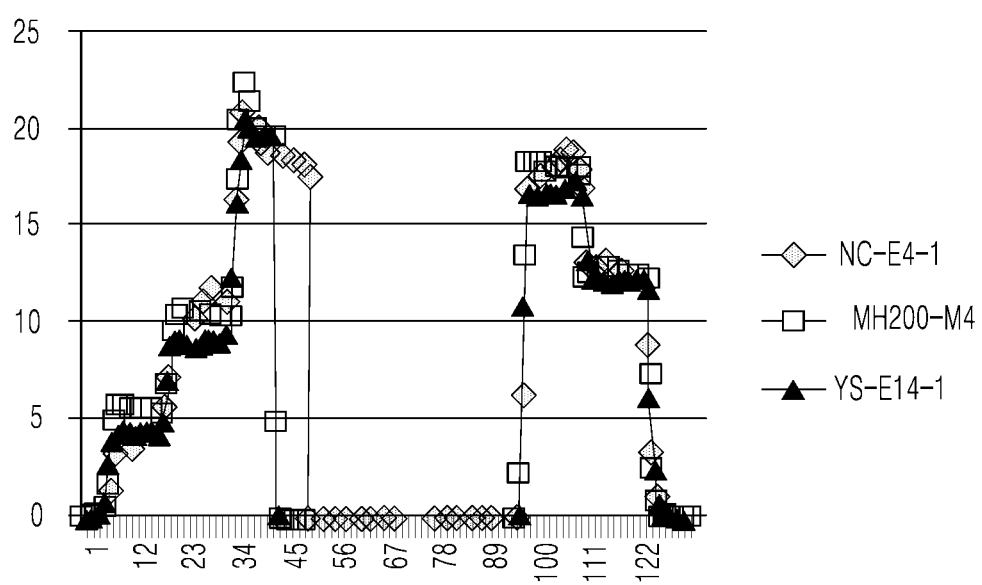

Based on the results of the magnitude of the load depending on the kind of coating composition in the loading test at low load positions as illustrated in FIGS. 4A and 4B, YS-3 exhibited slightly low or equal load, compared to lacquer (NC), and Resin A exhibited a high load, compared to two kinds of coating compositions. In particular, the non-coated virgin fuel rod had a greater load than the fuel rods treated with coating compositions. In the loading test at high load positions, Resin A showed the greatest load, and YS and lacquer (NC) were measured to have similar values.

The scratching of the surface of the fuel rods in the loading test was analyzed, and thereby the effects of the coating film were compared. The depth and width of scratches were measured. The results are shown in Tables 3, 4 and 5 below.

TABLE 3

Results of measurement of scratching of fuel rods with existing lacquer (NC) coating film

| Sample | Load | Position | Upper (4-side) angle, ° | | | | Medium (4-side) angle, ° | | | | Lower (4-side) angle, ° | | | | Average depth | Average damaged width |
|---|---|---|---|---|---|---|---|---|---|---|---|---|---|---|---|---|
| | | | 0 | 90 | 180 | 270 | 0 | 90 | 180 | 270 | 0 | 90 | 180 | 270 | μm | mm |
| NC | Low load | A1 | 5.2 | 6.1 | 4.4 | 7.8 | 3.7 | 4.8 | 3.4 | 4.1 | 5.7 | 7.5 | 9.5 | 5.4 | 5.6 | 0.29 |
| | | B2 | 6.1 | 3.7 | 9.3 | 8.3 | 3.4 | 3.8 | 4.0 | 4.4 | 4.8 | 5.0 | 11.3 | 5.8 | 5.8 | 0.31 |
| | High load | C4 | 8.3 | 6.2 | 5.2 | 9.1 | 7.1 | 10.6 | 11.5 | 6.4 | 4.3 | 4.3 | 5.8 | 9.5 | 7.4 | 0.38 |
| | | E4 | 9.4 | 6.4 | 5.1 | 7.3 | 8.4 | 7.8 | 8.3 | 8.5 | 6.3 | 8.4 | 7.3 | 7.2 | 7.5 | 0.37 |
| | Average | | 7.3 | 5.6 | 6.0 | 8.1 | 5.7 | 6.8 | 6.8 | 5.9 | 5.3 | 6.3 | 8.5 | 7.0 | 6.6 | 0.34 |

TABLE 4

Results of measurement of scratching of fuel rods with Resin A coating film

| Sample | Load | Position | Upper (4-side) angle, ° | | | | Medium (4-side) angle, ° | | | | Lower (4-side) angle, ° | | | | Average depth | Average damaged width |
|---|---|---|---|---|---|---|---|---|---|---|---|---|---|---|---|---|
| | | | 0 | 90 | 180 | 270 | 0 | 90 | 180 | 270 | 0 | 90 | 180 | 270 | μm | mm |
| A | Low load | Q1 | 8.5 | 8.4 | 7.4 | 5.4 | 7.0 | 7.2 | 9.2 | 7.3 | 9.8 | 8.1 | 8.3 | 6.7 | 7.8 | 0.30 |
| | | P2 | 7.3 | 6.0 | 8.6 | 11.2 | 7.1 | 6.8 | 10.6 | 7.8 | 8.0 | 9.5 | 8.4 | 9.2 | 8.4 | 0.38 |
| | High load | O4 | 8.9 | 6.7 | 5.7 | 6.2 | 11.2 | 7.0 | 5.1 | 5.8 | 8.4 | 5.7 | 8.2 | 9.4 | 7.4 | 0.29 |
| | | M4 | 9.1 | 9.4 | 9.8 | 8.8 | 6.7 | 7.4 | 5.3 | 6.3 | 7.3 | 6.8 | 10.2 | 8.8 | 8.0 | 0.34 |
| | Average | | 8.5 | 7.6 | 7.9 | 7.9 | 8.0 | 7.1 | 7.6 | 6.8 | 8.4 | 7.5 | 8.8 | 8.5 | 7.9 | 0.33 |

TABLE 5

Results of measurement of scratching of fuel rods with YS-3 coating film

| Sample | Load | Position | Upper (4-side) angle, ° | | | | Medium (4-side) angle, ° | | | | Lower (4-side) angle, ° | | | | Average depth | Average damaged width |
|---|---|---|---|---|---|---|---|---|---|---|---|---|---|---|---|---|
| | | | 0 | 90 | 180 | 270 | 0 | 90 | 180 | 270 | 0 | 90 | 180 | 270 | μm | mm |
| YS-3 | Low load | A17 | 4.8 | 7.3 | 7.1 | 5.1 | 6.1 | 6.5 | 7.2 | 5.4 | 7.0 | 5.6 | 6.3 | 4.1 | 6.0 | 0.31 |
| | | B16 | 4.5 | 5.6 | 7.5 | 9.1 | 6.7 | 4.0 | 6.4 | 4.4 | 5.4 | 5.7 | 5.8 | 6.0 | 5.9 | 0.32 |
| | High load | C14 | 6.7 | 5.4 | 6.3 | 6.8 | 6.1 | 3.6 | 6.3 | 5.7 | 5.7 | 4.7 | 5.3 | 6.3 | 5.7 | 0.25 |
| | | E14 | 9.2 | 6.8 | 8.2 | 7.4 | 8.1 | 4.2 | 6.8 | 4.2 | 5.8 | 6.2 | 8.9 | 6.7 | 6.9 | 0.30 |
| | Average | | 6.3 | 6.3 | 7.3 | 7.1 | 6.8 | 4.6 | 6.7 | 4.9 | 6.0 | 5.6 | 6.6 | 5.8 | 6.1 | 0.30 |

For fuel rods coated with the existing lacquer (NC) coating composition, the fuel rods subjected to loading testing at low load positions were broadly divided into three portions, that is, the upper, medium and lower portions, and the depth of surface scratching was measured and averaged when individual portions of the fuel rods were rotated by 90°. At positions A1 and B2, the depth of scratching was measured to be 5.6 and 5.8 μm respectively, and at high load positions C4 and E4, the depth of scratching was measured to be 7.4 and 7.6 μm. Thus, scratches were more deeply formed in the loading test at high load positions than in the loading test at low load positions.

For Resin A, the depth of scratching was measured to be 7.8 and 8.4 μm at low load positions and 7.4 and 8.0 μm at high load positions, and thus there was no significant difference therebetween, unlike lacquer (NC). Relatively deep scratching of an average of 7.9 μm was recorded.

For YS-3 resin, the depth of scratching was measured to be 6.0 and 5.9 μm at low load positions and 5.7 and 6.9 μm at high load positions, and thus was regarded as low.

In the fuel rod loading test apparatus, the coating films were formed using three kinds of coating compositions, after which the loading test was performed, and the depth of scratching of the fuel rods was measured at angles in four directions with respect to three portions. Compared to the existing lacquer (NC) coating composition, scratching occurred to a deeper extent when using the Resin A coating composition, and occurred to a lesser extent when using the YS-3 resin coating composition. Hence, the YS-3 coating composition of the invention was found to be suitable for use as a water-soluble coating composition.

Example 4. Evaluation of Coating Composition Using Hot Air Drying and Air Drying Five fuel rods were coated with a YS-3 coating solution, three of which were dried for one day using hot air drying, and two of which were dried for one day using air drying. Thereafter, a loading test was performed using a fuel rod loading test apparatus, and the load was measured. The results are illustrated in FIGS. 6A and 6B.

Figure 6A:
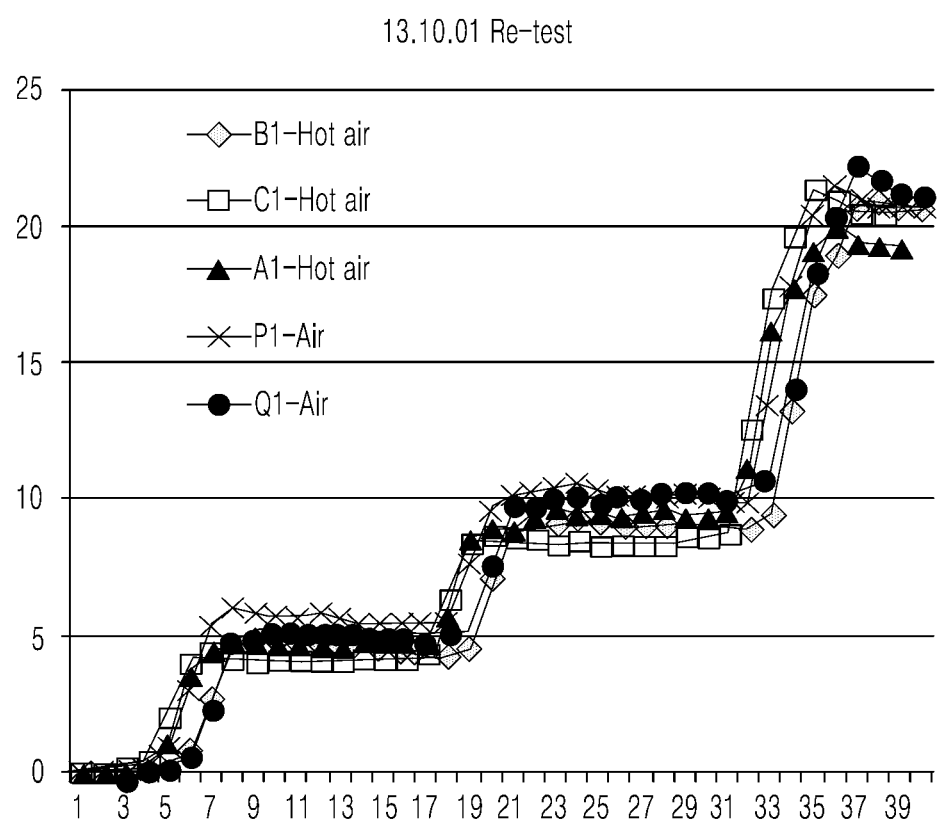
FIGS. 6A and 6B illustrate the results of testing of a YS-3 coating composition using a fuel rod loading test apparatus.
Figure 6B:
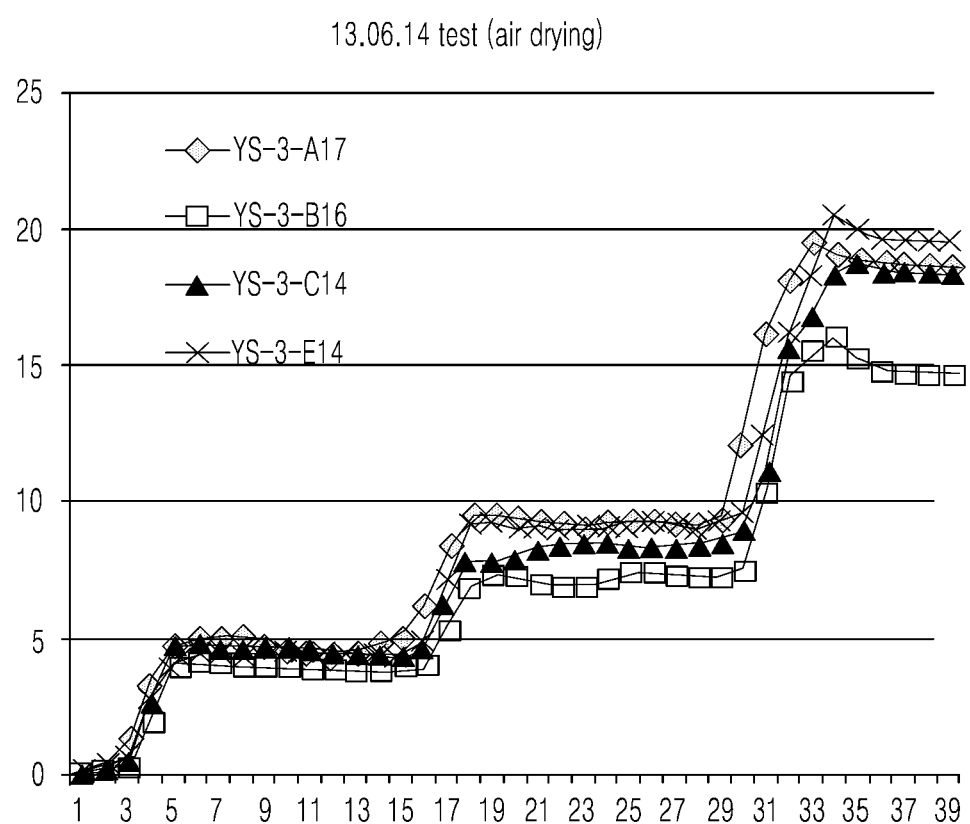

As illustrated in FIGS. 6A and 6B, in air drying, the fuel rods (P1, Q1) had a high load of 20 kg/cm² or more, but this was attributable to experimental error, and no significant difference was found. In hot air drying, the load was slightly decreased compared to air drying. Hence, hot air drying was determined to be more effective at forming the coating film, and was superior in scratch testing when evaluated with the naked eye.

Example 5. Evaluation of Coating Composition in Field Demonstration Test

For field demonstration testing of the water-soluble coating composition (YS-3), which was ultimately selected as an alternative to lacquer, a coating tank for a water-soluble coating composition was separately manufactured.

A washing process was performed using a cleaning tank that had been newly manufactured so as to have the same size as the coating tank.

Lead pellets were loaded in the fuel rods, and dummy fuel was manufactured under the same conditions as in the commercial production of existing lacquer (NC), tested and evaluated. In a coating process, the water-soluble coating solution (YS-3) was fed to a coating level of the coating tank (feed amount: about 350 kg, feed time in coating tank: 15 min), and the fuel rod assembly was incorporated in the coating tank and maintained for 5 min. In a drying process, the coating solution was drained to the bottom of the coating tank (requiring 3 min) and compressed air was blown for 25 min. After blowing for 25 min, the state of dryness was checked. Then, the fuel rod assembly was taken off the coating tank and then subjected to air drying, which required a total of 1.5 hr.

Figure 7:
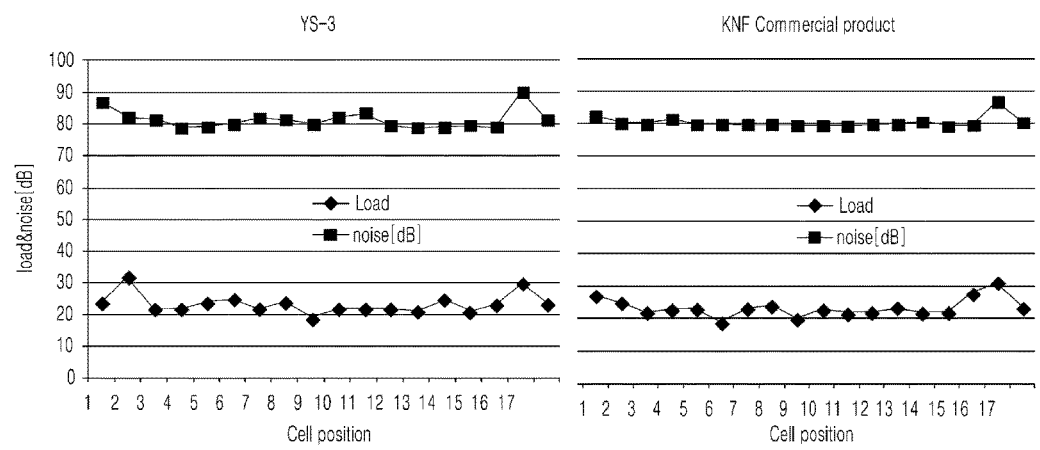
FIG. 7 illustrates the load and the noise upon loading of fuel rods.

FIG. 7 illustrates the results of measurement of load and noise in field demonstration testing. Load and noise results very similar to those of fuel rods coated with existing lacquer (NC) were exhibited.

Figure 8:
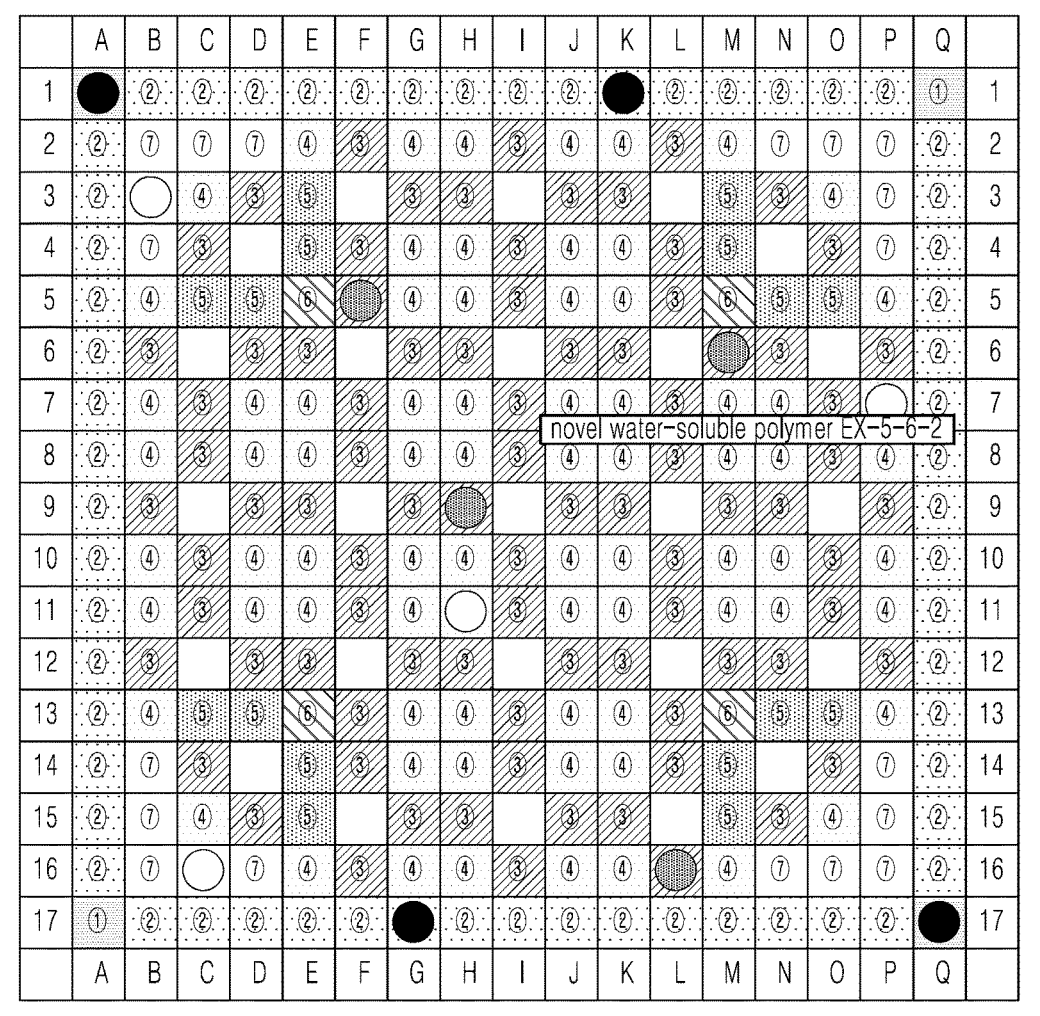

As illustrated in FIG. 8, surface scratch testing of fuel rods was performed using four blue outermost cells at low load positions, four yellow general cells at low load positions, and four red cells around guide tubes at high load positions. As is apparent from Table 6 below, the damaged depth was an average of 12.5 μm, satisfying allowable standards of 25 μm or less, and the damaged width was an average of 0.6 mm, satisfying allowable standards of 4.06 mm or less. Also, the scratching at high load positions was relatively deep compared to the scratching at low load positions.

TABLE 6

Results of measurement of surface scratching of fuel rods

| No. | Loading position | Damaged depth of fuel rod at position (standard: <25 μm) | | | | | | Damaged width standard <4.06 mm |
|---|---|---|---|---|---|---|---|---|
| | | Upper (4-side) 0 | Medium (4-side) 0 | Lower (4-side) 0 | 90 | 180 | 270 | |
| 1 | A1 | 11.8 | 10.9 | 12.4 | 12.9 | 13.4 | 13.0 | 0.656 |
| 2 | K1 | 11.7 | 11.6 | 12.1 | 11.3 | 12.2 | 13.1 | 0.585 |
| 3 | G17 | 13.0 | 12.8 | 12.7 | 12.1 | 10.6 | 13.4 | 0.696 |
| 4 | Q1 | 12.2 | 11.6 | 12.0 | 12.2 | 13.6 | 12.9 | 0.549 |
| 5 | F5 | 13.1 | 13.8 | 13.3 | 11.0 | 13.8 | 13.5 | 0.614 |
| 6 | M6 | 13.6 | 13.1 | 13.5 | 12.8 | 13.7 | 13.4 | 0.670 |
| 7 | H9 | 11.9 | 10.6 | 12.6 | 12.3 | 11.9 | 13.1 | 0.547 |

TABLE 6-continued

Results of measurement of surface scratching of fuel rods

| No. | Loading position | Damaged depth of fuel rod at position (standard: <25 μm) | | | | | | Damaged width standard <4.06 mm |
|---|---|---|---|---|---|---|---|---|
| | | Upper (4-side) 0 | Medium (4-side) 0 | Lower (4-side) 0 | 90 | 180 | 270 | |
| 8 | L16 | 11.7 | 11.1 | 10.8 | 11.4 | 12.1 | 12.7 | 0.563 |
| 9 | B3 | 12.1 | 10.9 | 12.3 | 13.2 | 13.1 | 12.9 | 0.608 |
| 10 | P7 | 12.8 | 12.2 | 13.1 | 13.9 | 12.7 | 11.9 | 0.686 |
| 11 | C16 | 12.2 | 11.8 | 12.6 | 12.0 | 11.4 | 13.4 | 0.529 |
| 12 | H11 | 12.9 | 12.8 | 13.4 | 13.3 | 12.7 | 12.5 | 0.438 |
| | Average | 12.4 | 11.9 | 12.6 | 12.4 | 12.6 | 13.0 | 0.595 |

Figure 9:
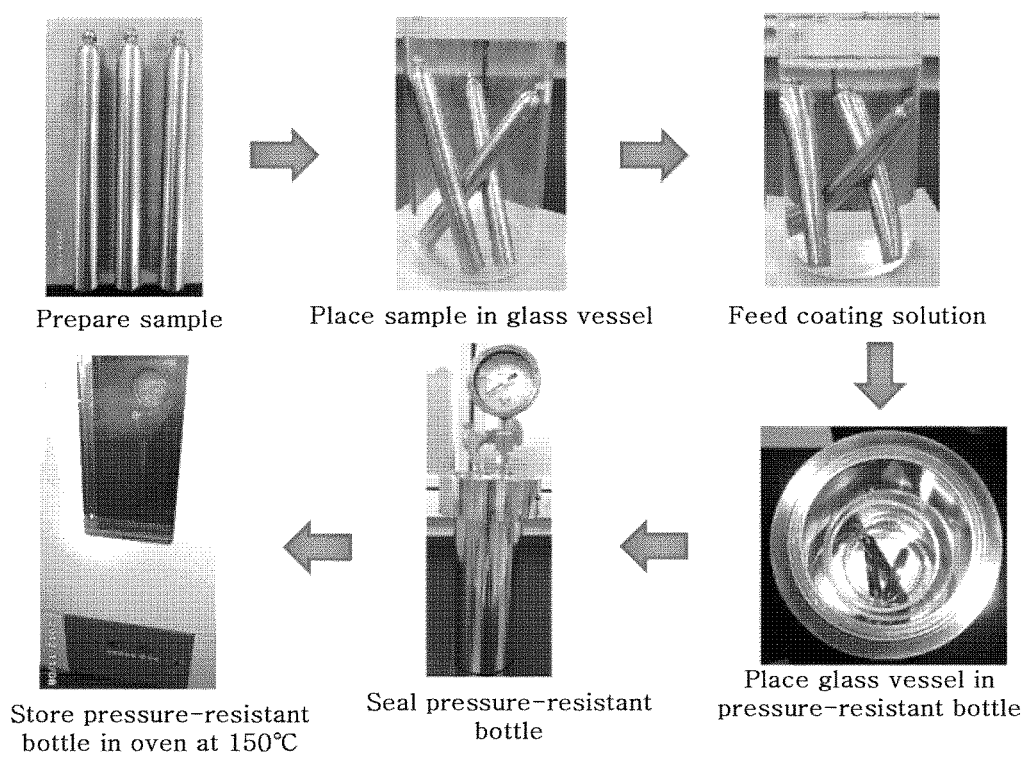
FIG. 9 illustrates a process for corrosion testing of fuel rods.

Example 6. Corrosion Testing of Fuel Rod Using Water-Soluble Coating Composition To evaluate the effects of the water-soluble coating composition solution on the corrosion of fuel rods, high-temperature corrosion testing was performed at 150° C. As illustrated in FIG. 9, three fuel rod samples were prepared and placed in a glass vessel, after which a coating composition solution was charged in the glass vessel so that the samples were immersed therein. Then, the glass vessel was placed in a pressure-resistant bottle, and the pressure-resistant bottle was sealed, followed by digest testing in an electric oven at 150° C. for two weeks.

Figure 10:
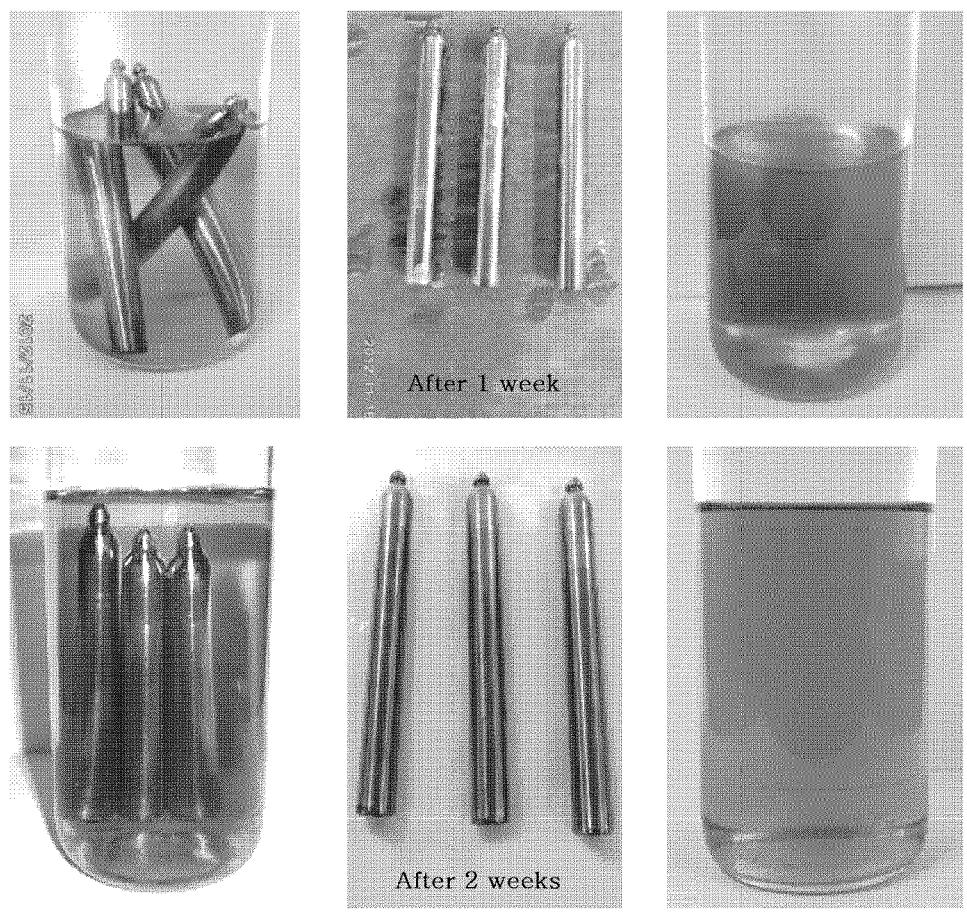
FIG. 10 illustrates the results of corrosion testing.

Based on the corrosion test results, as illustrated in FIG. 10, the fuel rods did not corrode. The reason why the color of the surface thereof was pale brown is that the oxidized coating solution was not removed.

Example 7. Measurement of Flash Point of Water-Soluble Coating Composition

The water-soluble coating composition includes the water-soluble polymer resin and the solvent comprising ethanol, isopropanol and water, and thus the flash point of volatile alcohol is regarded as important in terms of designing the process of coating fuel rods.

Accordingly, the flash point of the water-soluble coating composition was measured. The results thereof depending on the measurement method are as follows.

TABLE 7

Results of measurement of flash point

| Flash point | Measurement method |
|---|---|
| 22° C. | ASTM D56, Tag Closed Cup method |
| 23° C. | ISO 3680, Rapid Equilibrium method |

The crude water-soluble coating solution has a low flash point of 22-23° C., and thus must be kept clear of fire and heat, and requires a ventilated device.

Example 8. Measurement of Density of Water-Soluble Coating Composition and Maintenance of Concentration Thereof Since the solvent having high volatility compared to the water-soluble polymer is volatilized in the water-soluble coating composition having the flash point measured as described above, there is a concern of causing variation in the thickness of the coating film with an increase in the concentration of the water-soluble polymer in the coating solution during usage. Hence, a measurement method that is able to maintain and correct the appropriate concentration of the coating solution is required.

Figure 11:
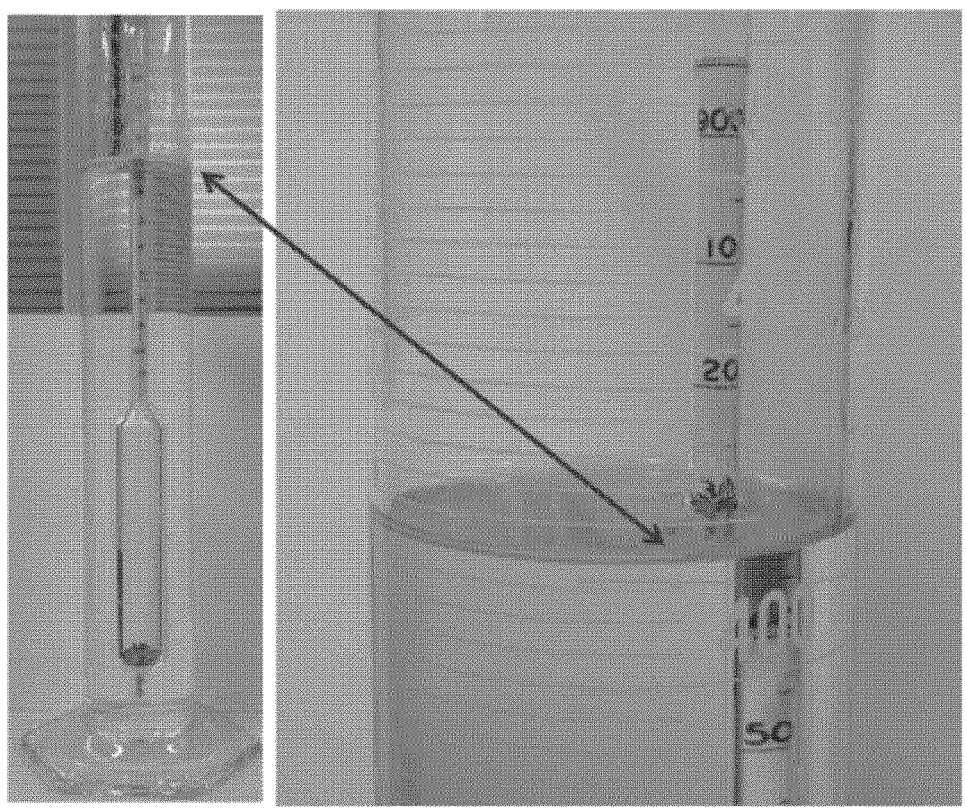
FIG. 11 illustrates a process of measuring the density of a coating solution in a coating tank.
Figure 12:
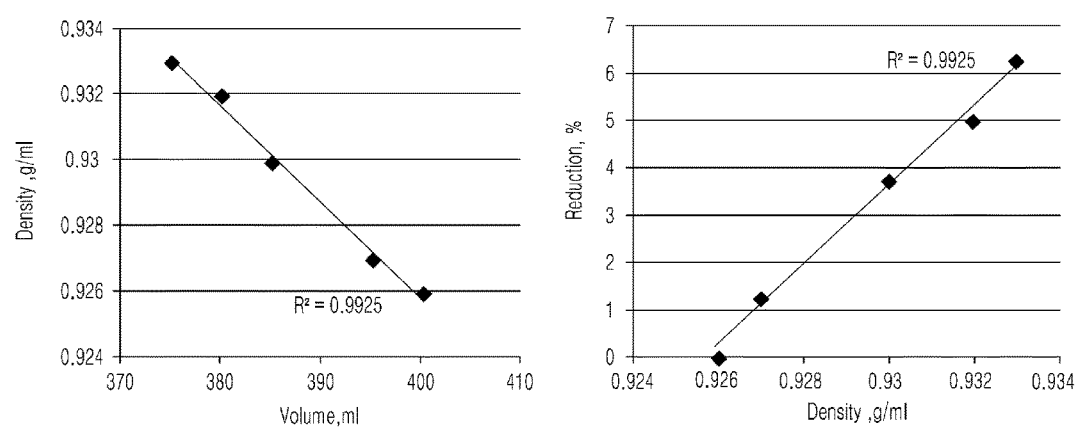
FIG. 12 illustrates the correlation between the volume and the density of the coating solution.

As illustrated in FIG. 11, a predetermined amount of coating solution was placed in a measuring cylinder, a hydrometer was immersed therein, and the density of the coating solution was measured. The initial density was measured to be 0.926 g/mL. Then, while the volume of the solution was reduced by the evaporation of alcohol, the density was measured. As shown in Table 8 below, the density was increased with a reduction in volume. Changes in density depending on the reduction in volume are depicted in FIG. 12, and the correlation therebetween is 0.9925 g/mL, which is evaluated to be nearly linear.

Upon actual usage of the coating solution based on these results, the concentration of the coating solution may be corrected by measuring the density thereof.

TABLE 8

Changes in density with reduction in solvent of coating solution

| Volume, mL | Reduction, % | Density, g/mL |
|---|---|---|
| 400 | 0 | 0.926 |
| 395 | 1.25 | 0.927 |
| 385 | 3.75 | 0.930 |
| 380 | 5 | 0.932 |
| 375 | 6.25 | 0.933 |

Although specific embodiments of the present invention have been disclosed in detail as described above, it is obvious to those skilled in the art that such a description is merely preferable exemplary embodiments and is not construed to limit the scope of the present invention. Therefore, the substantial scope of the present invention will be defined by the appended claims and equivalents thereof.

What is claimed is:

1. A coating solution for protecting a surface of a nuclear fuel rod, obtained by dissolving a polymer resin comprising 52-62 wt % of methacrylic acid, 34-42 wt % of 2-hydroxyethyl methacrylate and 0.01-12 wt % of methyl methacrylate in a solvent mixture of isopropanol, ethanol and water.

2. The coating solution of claim 1, comprising 9-12 wt % of the polymer resin and 88-91 wt % of the solvent mixture of isopropanol, ethanol and water.

3. A coating method for protecting a surface of a nuclear fuel rod, comprising:
   (1) forming a coating film on a surface of a nuclear fuel rod, using a coating solution obtained by dissolving a polymer resin comprising 52-62 wt % of methacrylic acid, 34-42 wt % of 2-hydroxyethyl methacrylate and 0.01-12 wt % of methyl methacrylate in a solvent mixture of isopropanol, ethanol and water;
   (2) drying the nuclear fuel rod; and
   (3) loading the dried nuclear fuel rod in a skeleton.

4. The coating method of claim 3, wherein forming the coating film in (1) is performed while a concentration of the coating solution is corrected to be maintained at an initial value by measuring a density of the coating solution using a hydrometer.

5. The coating method of claim 3, wherein drying the nuclear fuel rod in (2) is performed using hot air drying or air drying.

* * * * *